US011572455B2

(12) United States Patent
Hill et al.

(10) Patent No.: US 11,572,455 B2
(45) Date of Patent: *Feb. 7, 2023

(54) ANTIDEGRADANT BLEND

(71) Applicant: SI Group, Inc., The Woodlands, TX (US)

(72) Inventors: Jonathan Hill, Manchester (GB); Warren J. Ebenezer, Stockport (GB)

(73) Assignee: SI Group, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/755,356

(22) PCT Filed: Oct. 11, 2018

(86) PCT No.: PCT/EP2018/077698
§ 371 (c)(1),
(2) Date: Apr. 10, 2020

(87) PCT Pub. No.: WO2019/072951
PCT Pub. Date: Apr. 18, 2019

(65) Prior Publication Data
US 2020/0239669 A1 Jul. 30, 2020

(30) Foreign Application Priority Data
Oct. 12, 2017 (GB) ..................... 1716709

(51) Int. Cl.
*C08K 13/02* (2006.01)
*C08K 3/32* (2006.01)
*C08K 5/098* (2006.01)
*C08K 5/13* (2006.01)

(52) U.S. Cl.
CPC ............... *C08K 13/02* (2013.01); *C08K 3/32* (2013.01); *C08K 5/098* (2013.01); *C08K 5/13* (2013.01)

(58) Field of Classification Search
CPC .......... C08K 13/02; C08K 3/32; C08K 5/098; C08K 5/13
See application file for complete search history.

(56) References Cited

U.S. PATENT DOCUMENTS

| 4,324,882 | A  | 4/1982  | Takekoshi        |
| 6,166,170 | A  | 12/2000 | Putzig           |
| 6,359,049 | B1 | 3/2002  | Carrico et al.   |
| 6,362,152 | B1 | 3/2002  | Young et al.     |
| 6,605,658 | B1 | 8/2003  | Broussard et al. |
| 6,610,765 | B1 | 8/2003  | Pfaendner et al. |
| 6,664,317 | B2 | 12/2003 | King             |
| 6,858,805 | B2 | 2/2005  | Blew et al.      |
| 6,902,695 | B2 | 6/2005  | Stadler et al.   |
| 7,074,851 | B2 | 7/2006  | Charbonneaux et al. |
| 7,138,356 | B2 | 11/2006 | Putzig           |
| 7,169,742 | B2 | 1/2007  | Sivik et al.     |
| 7,348,396 | B2 | 3/2008  | Sicken et al.    |
| 7,417,085 | B2 | 8/2008  | Kimura           |
| 8,007,885 | B2 | 8/2011  | Topoulos         |
| 8,008,383 | B2 | 8/2011  | Gelbin et al.    |
| 8,349,923 | B2 | 1/2013  | Roth             |
| 8,404,626 | B2 | 3/2013  | Kolics et al.    |
| 8,524,816 | B2 | 9/2013  | Badyrka et al.   |
| 8,541,078 | B2 | 9/2013  | Adams et al.     |
| 8,557,910 | B2 | 10/2013 | Arpin            |
| 9,006,156 | B2 | 4/2015  | Saccomando et al. |
| 9,228,080 | B2 | 1/2016  | Arpin            |
| 9,728,439 | B2 | 8/2017  | Pillalamarri et al. |
| 9,790,360 | B2 | 10/2017 | Puchalski et al. |
| 9,957,376 | B2 | 5/2018  | Huang et al.     |
| 10,106,744 | B2 | 10/2018 | Schneider et al. |
| 10,501,636 | B2 | 12/2019 | Jenree et al.    |
| 10,703,734 | B2 | 7/2020  | Hu et al.        |
| 10,975,278 | B2 | 4/2021  | Kozakiewicz et al. |
| 2003/0173544 | A1 | 9/2003 | Eichenauer       |
| 2005/0143518 | A1 | 6/2005 | Eichenauer       |
| 2005/0288403 | A1 | 12/2005 | De la Cruz et al. |
| 2006/0293435 | A1 | 12/2006 | Marens et al.    |
| 2008/0023673 | A1 | 1/2008  | Reith et al.     |
| 2011/0039996 | A1 | 8/2011  | Hornbach et al.  |
| 2011/0196082 | A1 | 8/2011  | Hornbach et al.  |
| 2015/0337108 | A1 | 11/2015 | Ieda et al.      |
| 2018/0179377 | A1 | 6/2018  | Bayer et al.     |

FOREIGN PATENT DOCUMENTS

| CN | 1465558 | | 1/2004 | |
| CN | 1252183 | | 9/2004 | |
| CN | 1699353 | | 11/2005 | |
| CN | 100482633 | | 4/2009 | |
| CN | 102952308 | | 3/2013 | |
| CN | 103102640 | A * | 5/2013 | ............ B29C 48/04 |
| CN | 104403085 | | 3/2015 | |
| CN | 105017729 | | 11/2015 | |
| CN | 105315433 | | 2/2016 | |
| CN | 105524105 | | 4/2016 | |
| CN | 105542139 | | 5/2016 | |
| CN | 105906784 | | 8/2016 | |
| CN | 105949456 | | 9/2016 | |
| CN | 106000333 | | 10/2016 | |
| CN | 106084183 | | 11/2016 | |
| CN | 106916444 | | 7/2017 | |
| CN | 106987117 | | 7/2017 | |
| CN | 106995608 | | 8/2017 | |
| CN | 107345068 | | 11/2017 | |
| CN | 107501882 | | 12/2017 | |

(Continued)

OTHER PUBLICATIONS

English machine translation of JP 06-256621A. (Year: 1994).*
English machine translation of CN 103102540A. (Year: 2013).*

*Primary Examiner* — John E Uselding
(74) *Attorney, Agent, or Firm* — Dority & Manning, P.A.

(57) ABSTRACT

The present invention is directed to an antidegradant blend, comprising: at least one metal carboxylate; at least one inorganic phosphite; at least one phenolic antioxidant; and at least one organic phosphite antioxidant. As examples, the metal carboxylate may comprise a metal stearate, a metal lactate and/or a metal benzoate while the inorganic phosphite may comprise one or more metal hypophosphites.

19 Claims, No Drawings

(56) References Cited

FOREIGN PATENT DOCUMENTS

| | | |
|---|---|---|
| CN | 107523050 | 12/2017 |
| CN | 107793321 | 3/2018 |
| CN | 109486179 | 3/2019 |
| CN | 109666294 | 4/2019 |
| CN | 109666295 | 4/2019 |
| CN | 109679339 | 4/2019 |
| CN | 109748933 | 5/2019 |
| CN | 109867779 | 6/2019 |
| CN | 109957107 | 7/2019 |
| CN | 110054891 | 7/2019 |
| CN | 110563872 | 12/2019 |
| CN | 110615865 | 12/2019 |
| CN | 110951073 | 4/2020 |
| CN | 111004501 | 4/2020 |
| CN | 111073275 | 4/2020 |
| CN | 111269413 | 6/2020 |
| CN | 111269564 | 6/2020 |
| GB | 1058229 | 2/1967 |
| GB | 2562466 | 11/2018 |
| JP | 06256621 A * | 9/1994 .............. C08L 59/00 |
| JP | 2001081271 | 3/2001 |
| JP | 4480391 | 7/2005 |
| JP | 3927041 | 6/2007 |
| JP | 4446731 | 4/2010 |
| JP | 4446747 | 6/2010 |
| JP | 2013064041 | 4/2013 |
| JP | 6035066 | 11/2016 |
| JP | 2020019914 | 2/2020 |
| KR | 20170049119 | 5/2017 |
| TW | 201811885 | 4/2018 |
| WO | WO9963159 | 12/1999 |
| WO | WO2013045163 | 3/2002 |
| WO | 02/31053 A2 | 4/2002 |
| WO | 2011/023402 A1 | 3/2011 |
| WO | WO2015032033 | 3/2015 |
| WO | WO2015055852 | 4/2015 |

\* cited by examiner

ANTIDEGRADANT BLEND

CROSS-REFERENCE TO RELATED APPLICATIONS

This application is a 371 national-stage application of International PCT Application No. PCT/EP2018/077698, filed Oct. 11, 2018, which claims priority to United Kingdom Patent Application No. 1716709.9, filed Oct. 12, 2017, all of which are incorporated herein by reference in their entirety.

The present invention relates to antidegradant blends. More specifically, but not exclusively, the present invention relates to antidegradant blends for stabilising polymers, for example polyolefins.

Polymers are used in a wide variety of applications. For many polymer applications, it is desirable for the polymer to retain certain of its properties during storage, handling and subsequent application. More specifically, it may be desirable for the polymer to retain its melt flow properties, viscosity and have good colour stability, even during prolonged or repeated exposure to heat.

To aid retention of polymer properties, such as melt flow, viscosity and colour stability, it is known to add different types of additives to the polymer, for example phenolic antioxidants, organic phosphite antioxidants, acid scavengers, or combinations thereof.

US2008023673 relates to a stabilizer composition which comprises at least one calcium compound and one isocyanurate bearing hydroxy groups and also one dye or one pigment or both for weathering-resistant thermoplastic resin compositions WO2011023402 relates to processes for formulating melts comprising at least one salt of the general formula $Ca_xAl_2(OH)_{2(x+3)-ny}A_y^{n-}*mH_2O$, in which x is from 2 to 12, y is from 0 to (2x+5)/2, m is from 0 to 12 and n is from 1 to 3.

WO0231053 relates to a miscible blend of at least two polyamides including at least one semicrystalline polyamide; (b) glass filler; and (c) a catalyst containing phosphorus in an oxidation state of +1, +2, or +3.

Our international patent application WO 2015/055852 describes a stabilising composition for hot melt adhesives, comprising: a first stabilising component comprising at least one phenolic antioxidant; a second stabilising component comprising at least one phosphite antioxidant; and a third stabilising component comprising at least one antioxidant containing a sulphur group having the formula —$CH_2$—$(S)_x$—$CH_2$—, wherein x is 1 or 2, and wherein neither of the —$CH_2$— groups is directly bonded to an aromatic group.

WO 2015/055852 contemplates the use of acid scavengers in the stabilising composition. The acid scavengers are selected from epoxidized oils, metal salts of fatty acids, metal oxides, metal hydroxides, metal carbonates, metal salts and hydrotalcite-like compounds.

Degradation of polymers may produce acidic products which may cause acceleration of the degradative process. Catalytic residues in polymers may also be acidic and may contribute to, or cause, such degradation or the acceleration thereof. The inclusion of acid scavengers in polymer compositions is known to counteract this effect as acid scavengers act to pick up protons and, thus, maintain a relatively high pH in the polymer.

However, a high pH can cause phenolic antioxidants to discolour. The inclusion of organic phosphite antioxidants in the polymeric composition can ameliorate this effect i.e. reduce discolouration, but only to a limited extent.

Our co-pending application GB 1707120.0 contemplates a way to address this problem, namely by replacing the acid scavenger with a buffer. More specifically, the application describes a stabilising composition comprising: at least one antioxidant comprising one or more of a phenolic antioxidant, a phosphite antioxidant, a sulphur-containing antioxidant, and an aminic antioxidant; and at least one buffering agent, wherein the buffering agent has the capacity to buffer in aqueous solution at a pH range from 4 to 8.

However, in many polymer applications, the presence of an acid scavenger, particularly a metal carboxylate such as a metal stearate, is desirable for reasons in addition to reducing degradation of the polymer. For example, metal stearates are known to be useful lubricants, and can be beneficial in certain polymer moulding applications.

Thus, there remains a need to the art for an additive blend involving an acid scavenger which does not suffer the disadvantages outlined above, particularly with regards to discolouration and changes in viscosity of a polymer.

In accordance with the present invention there is provided an antidegradant blend, comprising:
  a metal carboxylate;
  an inorganic phosphite; and
  a phenolic antioxidant.

The inventors of the present invention have unexpectedly found that the presence of a metal carboxylate and an inorganic phosphite in the antidegradant blend produces a synergistic effect with respect to the colour stability of a variety of polymers. More specifically, the inventors of the present invention have found that the combination of a metal carboxylate and an inorganic phosphite in the antidegradant blend causes a significant reduction in colour formation. The synergistic effect is particularly apparent where the metal carboxylate is a metal stearate and the inorganic phosphite is a metal hypophosphite.

Overall, the antidegradant blend of the present invention significantly improves the heat aging performance of a variety of polymers, particularly with regards to colour stability, even during prolonged or repeated heat exposure. In addition, it has been found that the antidegradant blend of the present invention improves retention of melt flow properties and viscosity of a variety of polymers, even during prolonged or repeated heat exposure.

The improved colour stability and retention of melt flow properties and viscosity during prolonged exposure to heat is advantageous since polymers are often kept in a molten state for prolonged periods of time during production and prior to use in an application.

By 'prolonged heat exposure' we preferably mean exposure to a temperature of at least about 100° C., at least about 110° C., at least about 120° C., at least about 130° C., at least about 140° C., at least about 150° C., at least about 160° C., at least about 170° C., at least about 180° C., at least about 190° C., at least about 200° C., at least about 210° C., at least about 220° C., at least about 230° C., at least about 240° C. or at least about 250° C., for at least about 1 hour, at least about 2 hours, at least about 4 hours, at least about 6 hours, at least about 12 hours, at least about 24 hours, at least about 36 hours, at least about 48 hours, at least about 3 days, at least about 4 days, at least about 5 days, at least about 6 days, at least about 7 days, at least about 10 days or at least about 14 days.

By 'repeated heat exposure' we preferably mean exposure to a temperature of at least about 100° C., at least about 150° C., at least about 200° C., at least about 250° C., or at least about 300° C., on more than one occasion, for at least about 5 seconds, at least about 10 seconds, at least about 20 seconds, at least about 30 seconds, at least about 1 minute, at least about 5 minutes, or at least about 10 minutes. Repeated heat exposure may be experienced during multiple passes through an extruder.

The metal carboxylate may comprise a metal stearate, a metal lactate and/or a metal benzoate.

Preferably, the metal carboxylate comprises a metal stearate.

The metal stearate may comprise calcium stearate, zinc stearate, aluminium stearate, magnesium stearate, sodium stearate, cadmium stearate, barium stearate and/or a mixture of two or more thereof.

A particularly preferred metal stearate may comprise calcium stearate.

The metal lactate may comprise sodium lactate, magnesium lactate, calcium lactate, zinc lactate and/or a mixture of two or more thereof.

The metal benzoate may comprise sodium benzoate, magnesium benzoate, calcium benzoate, zinc benzoate and/or a mixture of two or more thereof.

The metal carboxylate, for example the metal stearate, may be present in an amount of from about 1% to about 50% by weight of the antidegradant blend, from about 1 to about 40% by weight of the antidegradant blend, or from about 1% to about 30% by weight of the antidegradant blend. Preferably, the metal carboxylate, for example the metal stearate, is present in an amount of from about 5% to about 30% by weight of the antidegradant blend, or from about 10% to about 20% by weight of the antidegradant blend.

The inorganic phosphite may comprise one or more metal hypophosphites.

The metal of the metal hypophosphite may be an alkali metal and/or an alkaline earth metal.

The alkali metal may be selected from lithium (Li), sodium (Na), and potassium (K).

The alkaline earth metal may be selected from calcium (Ca) and magnesium (Mg).

The metal hypophosphite may be selected from compounds with the formula: $MPO_2H_2$. In this case, M is an alkali metal cation, which may be selected from lithium (Li), sodium (Na), and potassium (K).

The metal hypophosphite may be selected from compounds with the formula $M(PO_2H_2)_2$. In this case, M is an alkaline earth metal cation, which may be selected from calcium (Ca) and magnesium (Mg).

A particularly preferred inorganic phosphite may comprise sodium hypophosphite.

The inorganic phosphite may be present in an amount of from about 1% to about 50% by weight of the antidegradant blend, from about 1% to about 40% by weight of the antidegradant blend, or from about 1% to about 30% by weight of the antidegradant blend. Preferably, the inorganic phosphite is present in an amount of from about 2% to about 20% by weight of the antidegradant blend, or from about 5% to about 15% by weight of the antidegradant blend.

The antidegradant blend may additionally comprise an organic phosphite antioxidant.

Where an organic phosphite antioxidant is present in the antidegradant blend, additional advantages may be realised.

Inorganic phosphites, for example metal hypophosphites, are generally considered to have poor mobility/solubility in polymers. However, the inventors of the present invention have surprisingly found that the mobility/solubility of the inorganic phosphite is greatly enhanced when an organic phosphite antioxidant is present in the antidegradant blend. Without wishing to be bound by any such theory, the inventors of the present invention believe that there is an interaction effect between the organic phosphite antioxidant and the inorganic phosphite such that as the organic phosphite antioxidant hydrolyses it aids dissolution of the inorganic phosphite in the polymer. This enhances the synergistic effect of the inorganic phosphite and the metal carboxylate.

The organic phosphite antioxidant may comprise a single organic phosphite antioxidant or a blend of two or more organic phosphite antioxidants.

The organic phosphite antioxidant may comprise, for example, bis(2,4,di-t-butylphenyl)pentaerythritol diphosphite (ULTRANOX™ 626—CAS 26741-53-7); 2,4,6-tri-tert-butylphenyl-2-butyl-2-ethyl-1,3-propanediol phosphite (ULTRANOX™ 641—CAS 161717-32-4); tris(2,4-di-t-butylphenyl)phosphite (ALKANOX™ 240—CAS 31570-04-4); tetrakis (2,4-di-t-butylphenyl)4,4'-biphenylene diphosphonite (ALKANOX™ 24-44—CAS 38613-77-3); tris(4-n-nonylphenyl)phosphite (WESTON™ TNPP—CAS 26523-78-4); distearylpentaerythritol diphosphite (WESTON™ 618—CAS 3806-34-6); bis(2,4-dicumylphenyl) pentaerythritol diphosphite (DOVERPHOS™ 9228—CAS 154862-43-8); WESTON™ 705—CAS 939402-02-5; tris(dipropyleneglycol) phosphite, $C_{18}H_{39}O_9P$ (WESTON™ 430—CAS 36788-39-3); poly(dipropylene glycol) phenyl phosphite (WESTON™ DHOP—CAS 80584-86-7); diphenyl isodecyl phosphite, $C_{22}H_{31}O_3P$ (WESTON™ DPDP—CAS 26544-23-0); phenyl diisodecyl phosphite (WESTON™ PDDP—CAS 25550-98-5); heptakis (dipropyleneglycol) triphosphite (WESTON™ PTP—CAS 13474-96-9); bis(2,6-di-ter-butyl-4-methylphenyl)pentaerythritol diphosphite (PEP 36—CAS 80693-00-1); and/or compatible mixtures of two or more thereof.

A particularly preferred organic phosphite antioxidant may comprise tris(2,4-di-t-butylphenyl)phosphite (ALKANOX™ 240—CAS 31570-04-4).

The organic phosphite antioxidant may be present in an amount of from about 20% to about 90% by weight of the antidegradant blend, from about 30% to about 80% by weight of the antidegradant blend, or from about 40% to about 70% by weight of the antidegradant blend. Preferably, the organic phosphite antioxidant is present in an amount of from about 40% to about 60% by weight of the antidegradant blend, or from about 45% to about 60% by weight of the antidegradant blend.

The phenolic antioxidant may comprise a single phenolic antioxidant or a blend of two or more phenolic antioxidants.

The phenolic antioxidant may comprise a partially hindered phenolic antioxidant and/or a hindered phenolic antioxidant.

In this context, by 'partially hindered' we preferably mean that the phenolic antioxidant comprises at least one substituent hydrocarbyl group ortho to the phenolic —OH group, where either none or only one of the or each substituent group is branched at the $C_1$ and/or $C_2$ position, preferably at the $C_1$ position, with respect to the aromatic ring.

The partially hindered phenolic antioxidant may comprise, for example, 2-(1,1-dimethylethyl)-4,6-dimethyl-phenol (LOWINOX™ 624—CAS 1879-09-0); 6-tert-butyl-2-methylphenol (CAS 2219-82-1); 4,6-di-tert-butyl-2-methylphenol; 2-tert-butyl-4-methylphenol; 2-tert-butyl-5-methylphenol; 2,4-di-tert-butylphenol; 2,4-di-tert-pentylphenol; triethyleneglycol-bis-[3-(3-t-butyl-4-hydroxy-5-methylphenyl)propionate] (LOWINOX™ GP45—CAS 36443-68-2); 1,3,5-tris(4-t-butyl-3-hydroxyl-2,6-dimethylbenzyl)-1,3,5-triazine-2,4,6-(1H, 3H, 5H)-trione (LOWINOX™ 1790); 2,2'-ethylidenebis[4,6-di-t-butylphenol] (ANOX™ 29—CAS 35958-30-6);

2,2'methylenebis(6-t-butyl-4-methylphenol) (LOWINOX™ 22M46—CAS 119-47-1); the butylated reaction product of p-cresol and dicyclopentadiene (LOWINOX™ CPL—CAS 68610-51-5); 2,6-xylenol; and/or compatible mixtures of two or more thereof.

In this context, by 'hindered' we preferably mean that the phenolic antioxidant comprises substituent hydrocarbyl groups on both positions ortho to the phenolic —OH group, each of those substituent groups being branched at the $C_1$ and/or $C_2$ position, preferably at the $C_1$ position, with respect to the aromatic ring.

The hindered phenolic antioxidant may comprise, for example, C13-C15 linear and branched alkyl esters of 3-(3'5'-di-t-butyl-4'-hydroxyphenyl) propionic acid (ANOX™ 1315—CAS 171090-93-0); octadecyl 3-(3',5'-di-t-butyl-4'-hydroxyphenyl) propionate (ANOX™ PP18—CAS 2082-79-3); N,N'-hexamethylene bis[3-(3,5-di-t-butyl-4-hydroxyphenyl)propionamide] (LOWINOX™ HD98—CAS 23128-74-7); C9-C11 linear and branched alkyl esters of 3-(3',5'-di-t-butyl-4'-hydroxyphenyl)propionic acid (NAUGARD™ PS48—CAS 125643-61-0); butylated hydroxytoluene (BHT—CAS 128-37-0); 2,6-di-tertiary-butyl-4-sec-butylphenol (ISONOX™ 132); 2,6-di-tertiary-butyl-4-nonylphenol (ISONOX™ 232); tetrakismethylene (3,5-di-t-butyl-4-hydroxyhydrocinnamate) methane (ANOX™ 20—CAS 6683-19-8); 1,3,5-tris(3,5-di-t-butyl-4-hydroxybenzyl) isocyanurate (ANOX™ IC14—CAS 27676-62-6); 1,2-bis(3,5-di-t-butyl-4-hydroxyhydrocinnamoyl)hydrazine (LOWINOX™ MD24—CAS 32687-78-8); 2,2'thiodiethylene bis[3(3,5-di-t-butyl-4-hydroxyphenyl) propionate] (ANOX™70—CAS 41484-35-9); 1,3,5-trimethyl-2,4,6-tris(3,5-di-t-butyl-4-hydroxybenzyl) benzene (ANOX™ 330—CAS 1709-70-2); and/or compatible mixtures of two or more thereof.

A particularly preferred phenolic antioxidant may comprise tetrakismethylene (3,5-di-t-butyl-4-hydroxyhydrocinnamate) methane (ANOX™ 20—CAS 6683-19-8).

The phenolic antioxidant may be present in an amount of from about 1% to about 50% by weight of the antidegradant blend, from about 1% to about 40% by weight of the antidegradant blend, or from about 5% to about 40% by weight of the antidegradant blend. Preferably, the phenolic antioxidant is present in an amount of from about 10% to about 35% by weight of the antidegradant blend, or from about 15% to about 30% by weight of the antidegradant blend.

A preferred antidegradant blend may comprise:
a metal stearate;
an inorganic phosphite;
an organic phosphite antioxidant; and
a phenolic antioxidant.

A particularly preferred antidegradant blend may comprise:
calcium stearate;
sodium hypophosphite;
tris(2,4-di-t-butylphenyl)phosphite (ALKANOX™ 240—CAS 31570-04-4); and tetrakismethylene (3,5-di-t-butyl-4-hydroxyhydrocinnamate) methane (ANOX™ 20—CAS 6683-19-8).

One or more further antioxidants, for example sulphur-containing antioxidants, aminic antioxidants, hydroxylamines or precursors thereof, lactone radical scavengers, acrylate radical scavengers, UV absorbers and/or chelating agents, may be included in the antidegradant blend.

Also provided in accordance with the present invention is the use of the antidegradant blend as hereinbefore described to stabilise a polymer.

Also provided in accordance with the present invention is the use of the antidegradant blend as hereinbefore described to stabilise a polyolefin.

Also provided in accordance with the present invention is a polymeric composition, comprising:
a polymeric base material; and
an antidegradant blend comprising:
a metal carboxylate;
an inorganic phosphite; and
a phenolic antioxidant.

The antidegradant blend may additionally comprise an organic phosphite antioxidant.

The metal carboxylate may comprise a metal stearate.

The inorganic phosphite may comprise a metal hypophosphite.

The antidegradant blend may be present in an amount of from about 0.01% to about 5% by weight of the polymeric composition. For example, the antidegradant blend may be present in an amount of from about 0.01% to about 2% by weight of the polymeric composition, from about 0.01% to about 1% by weight of the polymeric composition, or from about 0.1% to about 0.5% by weight of the polymeric composition.

The polymeric base material may comprise a polyolefin, polystyrene, polyacrylonitrile, a polyacrylate, a polyurethane, a polyamide, a polyester, a polycarbonate, polyvinyl chloride, an elastomer, a rubber and/or suitable mixtures, blends or copolymers thereof.

The polymeric base material may comprise a polyolefin.

The polyolefin may comprise a homopolymer or a copolymer.

The polyolefin may comprise polyethylene, polypropylene, polybutylene or a higher polyalkene.

Preferably, the polyolefin comprises polyethylene and/or polypropylene.

The polyethylene may comprise low density polyethylene (LDPE), linear low density polyethylene (LLDPE), medium density polyethylene (MDPE) and/or high density polyethylene (HDPE).

The polyolefin may comprise a copolymer of ethylene, propylene and/or butylene. The copolymer may be a random copolymer or a block copolymer. For example, the polyolefin may comprise an ethylene/propylene block copolymer, an ethylene/propylene random copolymer, an ethylene/propylene/butylene random terpolymer or an ethylene/propylene/butylene block terpolymer.

Additionally or alternatively, the polymeric base material may comprise a rubber. For example, the polymeric base material may comprise a styrenic block copolymer. The styrenic block copolymer may be selected from styrene-butadiene-styrene (SBS); styrene-isoprene-styrene (SIS); styrene-ethylene/butylene-styrene (SEBS); styrene-ethylene/propylene (SEP); styrene-butadiene rubber (SBR); or suitable mixtures or blends thereof.

Additionally or alternatively, the polymeric base material may comprise an ethylene vinyl acetate polymer, for example EVA.

For the avoidance of doubt, all features relating to the antidegradant blend may apply, where appropriate, to the use of the antidegradant blend, and to the polymeric composition, and vice versa.

The invention will now be more particularly described with reference to the following non-limiting examples.

EXAMPLES

Preparation of the Polymeric Composition

The polymeric base material was a polypropylene homopolymer commercially available under the trade name Moplen HF501N from LyondellBasell Industries Holdings, B. V., Delftseplein 27E, 3013 AA Rotterdam, Netherlands.

Numerous antidegradant blends were prepared.

Table 1 shows the different components that were used in the antidegradant blends.

TABLE 1

| Component | Shorthand | Type |
|---|---|---|
| Calcium stearate | CaSt | Acid Scavenger |
| Sodium hypophosphite | Na Hyp | Inorganic phosphite |
| ALKANOX ™ 240 | A240 | Organic phosphite antioxidant |
| ANOX ™ 20 | A20 | Phenolic antioxidant |

Table 2 shows the various antidegradant blends that were prepared. The % amounts shown in the table are % by weight of the overall polymeric composition.

TABLE 2

| Sample | CaSt (%) | Na Hyp (%) | A240 (%) | A20 (%) | Total (%) |
|---|---|---|---|---|---|
| 1 (Comp) | 0.03 | — | 0.08 | 0.04 | 0.15 |
| 2 | 0.03 | 0.01 | 0.08 | 0.04 | 0.16 |
| 3 | 0.03 | 0.015 | 0.08 | 0.04 | 0.165 |
| 4 | 0.03 | 0.01 | 0.09 | 0.03 | 0.16 |
| 5 | 0.02 | 0.02 | 0.08 | 0.04 | 0.16 |

Sample 1 is a comparative example which represents an industry standard antidegradant blend involving a calcium stearate acid scavenger.

Each of the above-identified antidegradant blends was compounded with the polypropylene base material in an extruder at a temperature of 240° C. under nitrogen to form a polymeric composition.

Colour Stability

Each of the polymeric compositions was multi-passed through an extruder at 260° C. under air. The discolouration of the compositions was measured in terms of Yellowness Index (YI) using a colorimeter. YI values were taken following compounding (pass 0) and after passes 1, 3 and 5. The lower the YI value, the less discolouration of the composition. The results are shown in Table 3.

TABLE 3

| | YI Value | | | |
|---|---|---|---|---|
| Sample | Pass 0 | Pass 1 | Pass 3 | Pass 5 |
| 1 (Comp) | −0.963 | 0.573 | 1.793 | 2.870 |
| 2 | −1.023 | −0.190 | 0.590 | 1.225 |
| 3 | −1.000 | −0.313 | 0.593 | 1.100 |
| 4 | −0.885 | −0.233 | 0.398 | 0.620 |
| 5 | −0.748 | 0.158 | 0.690 | 1.118 |

From the results, it can be seen that the polymeric compositions stabilised with the antidegradant blends in accordance with the present invention (Samples 2 to 5) show significantly less discolouration than the polymeric composition stabilised with the industry standard antidegradant blend (Sample 1).

Melt Flow Rate

The melt flow rate of the polymeric composition of Sample 1 and Sample 2 was determined following compounding (pass 0) and after pass 5, using a CEAST™ 7026 Melt Flow Tester according to standard test method ASTM D1238L with a temperature of 230° C., a 2.16 kg weight and a 2.095 mm die. An increase in the melt flow rate is indicative of unfavourable degradation of the sample. The results are shown in Table 4.

TABLE 4

| | Melt Flow Rate (g/10 min) | |
|---|---|---|
| Sample | Pass 0 | Pass 5 |
| 1 (Comp) | 10.28 | 17.87 |
| 2 | 10.23 | 16.60 |

From the results it can be seen that the polymeric composition stabilised using the antidegradant blend according to the present invention (Sample 2) retained its melt flow rate better than the polymeric composition stabilised using the industry standard antidegradant blend (Sample 1).

Sample 1 shows a 74% increase in melt flow rate after five passes through the extruder whereas Sample 2 only shows a 62% increase. This corresponds to a significant improvement in the melt flow rate retention on heat aging for Sample 2.

The invention claimed is:

1. An antidegradant blend, comprising:
   at least one metal carboxylate;
   at least one inorganic phosphite comprising one or more metal hypophosphites;
   at least one phenolic antioxidant; and
   at least one organic phosphite antioxidant, wherein the at least one organic phosphite antioxidant is present in an amount of from 20% to 90% by weight of the antidegradant blend.

2. The antidegradant blend according to claim 1, wherein the at least one metal carboxylate is a metal stearate, a metal lactate, a metal benzoate, or a combination thereof.

3. The antidegradant blend according to claim 2, wherein:
   a. the metal stearate is selected from the group consisting of calcium stearate, zinc stearate, aluminium stearate, magnesium stearate, sodium stearate, cadmium stearate, barium stearate, and mixtures thereof;
   b. the metal lactate is selected from the group consisting of sodium lactate, magnesium lactate, calcium lactate, zinc lactate, mixtures thereof; and/or
   c. the metal benzoate is selected from the group consisting of sodium benzoate, magnesium benzoate, calcium benzoate, zinc benzoate mixtures thereof.

4. The antidegradant blend according to claim 1, wherein the at least one metal carboxylate is present in an amount ranging from 1% to 50%, by weight of the antidegradant blend.

5. The antidegradant blend according to claim 1, wherein the metal of the one or more metal hypophosphites is an alkali metal selected from lithium, sodium, or potassium; and/or an alkaline earth metal selected from calcium or magnesium.

6. The antidegradant blend according to claim 1, wherein the at least one inorganic phosphite is a sodium hypophosphite.

7. The antidegradant blend according to claim 1, wherein the at least one inorganic phosphite is present in an amount ranging from 1% to 50%, by weight of the antidegradant blend.

8. The antidegradant blend according to claim 1, wherein the at least one organic phosphite antioxidant is selected from the group consisting of bis(2,4-di-t-butylphenyl)pentaerythritol diphosphite; 2,4,6-tri-tert-butylphenyl-2-butyl-2-ethyl-1,3-propanediol phosphite; tris(2,4-di-t-butylphenyl)phosphite; tetrakis (2,4-di-t-butylphenyl)4,4'-biphenylene diphosphonite; tris(4-n-nonylphenyl) phosphite; distearylpentaerythritol diphosphite; bis(2,4-dicumylphenyl) pentaerythritol diphosphite; phosphorus acid, mixed 2,4-bis(1,1-dimethylpropyl)phenyl and 4-(1,1-dimethylpropyl)phenyl triesters—CAS 939402-02-5; tris (dipropyleneglycol) phosphite, $C_{18}H_{39}O_9P$, poly(dipropylene glycol) phenyl phosphite; diphenyl isodecyl phosphite, $C_{22}H_{31}O_3P$; phenyl diisodecyl phosphite; heptakis (dipropyleneglycol) triphosphite; bis(2,6-di-ter-butyl-4-methylphenyl)pentaerythritol diphosphite; and combinations thereof.

9. The antidegradant blend according to claim 1, wherein the at least one organic phosphite antioxidant is present in an amount ranging from 30% to 80%, by weight of the antidegradant blend.

10. The antidegradant blend according to claim 1, wherein the at least one phenolic antioxidant is a partially hindered phenolic antioxidant, a hindered phenolic antioxidant, or a combination thereof.

11. The antidegradant blend according to claim 10, wherein:
   a. the partially hindered phenolic antioxidant is selected from the group consisting of 2-(1,1-dimethylethyl)-4,6-dimethyl-phenol; 6-tert-butyl-2-methylphenol; 4,6-di-tert-butyl-2-methylphenol; 2-tert-butyl-4-methylphenol; 2-tert-butyl-5-methylphenol; 2,4-di-tert-butylphenol; 2,4-di-tert-pentylphenol; triethyleneglycol-bis-[3-(3-t-butyl-4-hydroxy-5-methylphenyl)propionate]; 1,3,5-tris(4-t-butyl-3-hydroxyl-2,6-dimethylbenzyl)-1,3,5-triazine-2,4,6-(1H, 3H, 5H)-trione; 2,2'-ethylidenebis[4,6-di-t-butylphenol]; 2,2'methylenebis(6-t-butyl-4-methylphenol); the butylated reaction product of p-cresol and dicyclopentadiene; 2,6-xylenol; and combinations thereof; and/or
   b. the hindered phenolic antioxidant is selected from the group consisting of C13-C15 linear and branched alkyl esters of 3-(3'5'-di-t-butyl-4'-hydroxyphenyl) propionic acid; octadecyl 3-(3',5'-di-t-butyl-4'-hydroxyphenyl) propionate; N,N'-hexamethylene bis[3-(3,5-di-t-butyl-4-hydroxyphenyl)propionamide]; C9-C11 linear and branched alkyl esters of 3-(3',5'-di-t-butyl-4'-hydroxyphenyl)propionic acid; butylated hydroxytoluene; 2,6-di-tertiary-butyl-4-sec-butylphenol; 2,6-di-tertiary-butyl-4-nonylphenol; tetrakismethylene(3,5-di-t-butyl-4-hydroxyhydrocinnamate) methane; 1,3,5-tris(3,5-di-t-butyl-4-hydroxybenzyl) isocyanurate; 1,2-bis(3,5-di-t-butyl-4-hydroxyhydrocinnamoyl)hydrazine, 2,2'thiodiethylene bis[3(3,5-di-t-butyl-4-hydroxyphenyl)propionate]; 1,3,5-trimethyl-2,4,6-tris(3,5-di-t-butyl-4-hydroxybenzyl)benzene; and combinations thereof.

12. The antidegradant blend according to claim 1, wherein the at least one phenolic antioxidant is present in an amount ranging from 1% to 50%, by weight of the antidegradant blend.

13. The antidegradant blend according claim 1, further comprising one or more antioxidants selected from the group consisting of sulphur-containing antioxidants; aminic antioxidants; hydroxylamines or precursors thereof; lactone radical scavengers; acrylate radical scavengers; UV absorbers; and chelating agents.

14. A method of using the antidegradant blend according to claim 1 to stabilize a polymer, comprising the step of contacting a suitable amount of the antidegradant blend with a composition containing a polymer, resulting in a stabilized polymer.

15. A polymeric composition, comprising:
   a polymeric base material; and
   an antidegradant blend according to claim 1.

16. The polymeric composition according to claim 15, wherein the antidegradant blend is present in an amount ranging from 0.01% to 5%, by weight of the polymeric composition.

17. The polymeric composition according to claim 15, wherein the polymeric base material is selected from the group consisting of a polyolefin, polystyrene, polyacrylonitrile, a polyacrylate, a polyurethane, a polyamide, a polyester, a polycarbonate, polyvinyl chloride, an elastomer, a rubber, and combinations, blends or copolymers thereof.

18. The polymeric composition according to claim 17, wherein the polymeric base material is a polyolefin.

19. The polymeric composition according to claim 18, wherein the polyolefin is selected from the group consisting of polyethylene, polypropylene, polybutylene, and copolymers thereof.

* * * * *